(12) United States Patent
Fujiwara (10) Patent No.: US 10,942,508 B2
(45) Date of Patent: *Mar. 9, 2021

(54) RISK ASSESSMENT DEVICE, RISK ASSESSMENT SYSTEM, RISK ASSESSMENT METHOD, RISK ASSESSMENT PROGRAM, AND DATA STRUCTURE

(71) Applicant: TLV Co., Ltd., Kakogawa (JP)

(72) Inventor: Yoshiyasu Fujiwara, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/614,916

(22) PCT Filed: Jul. 19, 2018

(86) PCT No.: PCT/JP2018/027119
§ 371 (c)(1),
(2) Date: Nov. 19, 2019

(87) PCT Pub. No.: WO2019/049521
PCT Pub. Date: Mar. 14, 2019

(65) Prior Publication Data
US 2020/0192345 A1    Jun. 18, 2020

(30) Foreign Application Priority Data
Sep. 6, 2017 (JP) .............................. JP2017-171489

(51) Int. Cl.
G05B 23/02 (2006.01)
G06Q 10/06 (2012.01)
(52) U.S. Cl.
CPC ..... *G05B 23/0283* (2013.01); *G06Q 10/0635* (2013.01)
(58) Field of Classification Search
None
See application file for complete search history.

(56) References Cited

U.S. PATENT DOCUMENTS 8,914,252 B2   12/2014  Fujiwara et al.
2009/0312930 A1*  12/2009  Nakakita .............. F01D 17/08
                                                         701/100

(Continued)

FOREIGN PATENT DOCUMENTS

CN   102169736   *  1/2013  ........... G21C 13/032
CN   104573850 A    4/2015
(Continued)

OTHER PUBLICATIONS

2013 IEEE Intl. Conference on Industrial Engineering and Engineering Management, IEEE, Dec. 10, 2013, pp. 1437-1441.

(Continued)

*Primary Examiner* — Tung S Lau
(74) *Attorney, Agent, or Firm* — The Webb Law Firm (57) ABSTRACT

A risk assessment device for performing risk assessment includes a diagnosis result storage unit that accumulatively stores diagnosis results of a plurality of diagnoses regarding each process device that is provided in a steam plant to be assessed, in association with installation sites of the process devices, a risk information calculation unit that calculates risk information regarding a likelihood of malfunction of a process device that is provided at a target installation site, based on diagnosis results regarding process devices that are provided at the target installation site, and a device group risk information calculation unit that calculates device group risk information regarding a likelihood of malfunction of a target device group, based on the risk information regarding installation sites of respective process devices that constitute the target device group.

7 Claims, 4 Drawing Sheets

(56) References Cited

U.S. PATENT DOCUMENTS

| | | | |
|---|---|---|---|
| 2017/0024267 A1 | 1/2017 | Ihara et al. | |
| 2017/0102982 A1 | 4/2017 | Kolandavelu et al. | |
| 2017/0236065 A1* | 8/2017 | Kirschnick | G06Q 10/06 |
| | | | 702/181 |
| 2019/0072006 A1* | 3/2019 | Duffy | F01K 23/101 |
| 2020/0019139 A1* | 1/2020 | Mita | G05B 19/4063 |
| 2020/0056964 A1* | 2/2020 | Mita | G01M 99/008 |
| 2020/0202236 A1* | 6/2020 | Fujiwara | G06N 5/02 |

FOREIGN PATENT DOCUMENTS

| | | | | |
|---|---|---|---|---|
| EP | 3614221 | * | 2/2020 | G06Q 10/0635 |
| JP | 2007183929 A | | 7/2007 | |
| JP | 2007309250 | * | 11/2007 | F01D 17/08 |
| JP | 2007309250 A | | 11/2007 | |
| JP | 201279068 A | | 4/2012 | |
| JP | 2018555989 | * | 8/2019 | G01Q 10/0635 |
| KR | 20200009081 | * | 1/2020 | G05B 23/02 |

OTHER PUBLICATIONS

IEEE Transaction on Reliability, IEEE Service Center, Piscataway, NJ, US, vol. 58, No. 3, Sep. 1, 2009, pp. 539-552.

* cited by examiner

RISK ASSESSMENT DEVICE, RISK ASSESSMENT SYSTEM, RISK ASSESSMENT METHOD, RISK ASSESSMENT PROGRAM, AND DATA STRUCTURE

CROSS-REFERENCE TO RELATED APPLICATIONS

This application is the United States national phase of International Application No. PCT/JP2018/027119 filed Jul. 19, 2018, and claims priority to Japanese Patent Application No. 2017-171489 filed Sep. 6, 2017, the disclosures of which are hereby incorporated by reference in their entirety.

TECHNICAL FIELD

The present disclosure relates to a risk assessment device, a risk assessment system, a risk assessment method, a risk assessment program, and a data structure for performing risk assessment of a steam plant that includes at least one device group that includes a steam-utilizing device that utilizes steam, a piping system that is connected to the steam-utilizing device, and process devices that are provided in the piping system.

BACKGROUND ART

In recent years, risk assessment using the technique of risk-based inspection (RBI) that takes risks into consideration has been performed in steam plants such as petrochemical plants and thermal power plants (it should be noted that an assessment technique based on RBI is standardized as API581 by the American Petroleum Institute (API)). As disclosed in JP 5884000B1 (Patent Document 1), in such risk assessment, the risk of each device is assessed based on two values that indicate the likelihood that the device will malfunction (probability of malfunction) and the degree of influence that will be exerted when the device malfunctions.

The likelihood that a process device, such as a steam trap, that is installed in a steam plant will malfunction is affected not only by the device itself but also by the environment of the installation site, and therefore JP 5010472B2 (Patent Document 2) proposes determining the likelihood of malfunction of a device that is installed at a predetermined site in a plant, using diagnosis results regarding process devices that have been provided at the target installation site, focusing on the installation site rather than individual devices.

PRIOR ART DOCUMENTS

Patent Documents

Patent Document 1: JP 5884000B1 (or corresponding US 2017/024267A1)
Patent Document 2: JP 5010472B2 (or corresponding U.S. Pat. No. 8,914,252B2)

DISCLOSURE OF THE INVENTION

Problem to be Solved by the Invention

However, it is preferable that risk assessment of a steam plant is performed not only for each device but also for each device group (asset) that includes a steam-utilizing device, a piping system, process devices, and the like.

Therefore, it is desirable to realize a risk assessment device, a risk assessment system, a risk assessment method, a risk assessment program, and a data structure with which risk assessment can be performed for each device group.

Means for Solving Problem

A risk assessment device according to the present disclosure is a risk assessment device for performing risk assessment of a steam plant that includes at least one device group that includes a steam-utilizing device that utilizes steam, a piping system that is connected to the steam-utilizing device, and process devices that are provided in the piping system, the risk assessment device including:

a diagnosis result storage unit that accumulatively stores diagnosis results of a plurality of diagnoses regarding each process device that is provided in the steam plant to be assessed, in association with installation sites of the process devices;

a risk information calculation unit configured to calculate risk information regarding a likelihood of malfunction of a process device that is provided at a target installation site, based on diagnosis results regarding process devices that are and have been provided at the target installation site; and a device group risk information calculation unit configured to calculate device group risk information regarding a likelihood of malfunction of a target device group among the at least one device group, based on the risk information regarding installation sites of respective process devices that constitute the target device group.

In the steam plant, devices that constitute a device group relate to each other. For example, operation conditions of a steam-utilizing device relate to a load applied to a process device, and abnormality that occurred in the process device affects the steam-utilizing device. In particular, in the case of a device group that includes a steam-utilizing device, a piping system, and process devices, malfunction of the process devices, which affects steam flowing into the steam-utilizing device or flowing from the steam-utilizing device, is a dominant factor in assessing the likelihood of malfunction of the device group. Further, the likelihood of malfunction of each process device is also affected by the environment of the site at which the process device is installed. Therefore, according to this configuration, risk information regarding the target device group is calculated based on risk information that is focused on the installation sites of the respective process devices that constitute the target device group, and therefore it is possible to properly assess risks for each device group.

The following describes preferable aspects of the risk assessment device according to the present disclosure. However, the scope of the present disclosure is not limited by the following preferable aspects.

In one aspect, it is preferable that the risk assessment device further includes an arrangement relationship storage unit that stores, for each device group, an arrangement relationship between process devices that constitute the device group, and a calculation method storage unit that stores a calculation method for calculating the device group risk information according to an arrangement relationship between process devices constituting the device group, wherein the device group risk information calculation unit calculates the device group risk information regarding the target device group, using the calculation method that corresponds to an arrangement relationship between process devices constituting the target device group.

As described above, devices constituting a device group relate to each other, but the influence that is exerted by a process device on other devices varies according to the arrangement relationship between the process devices, for example, whether the arrangement relationship between the process devices is a series relationship or a parallel relationship. Therefore, according to this configuration, a calculation method according to the arrangement relationship between process devices constituting a process device group is determined in advance, and the device group risk information is calculated using the calculation method, and therefore it is possible to more properly assess risks for each device group.

In one aspect, it is preferable that the risk assessment device further includes a device group information storage unit that stores, for each device group, device group information regarding a configuration of the device group, and a determination unit configured to determine, with respect to the target device group, whether or not the diagnosis results accumulated with respect to each process device constituting the target device group satisfy a predetermined standard, wherein, if it is determined by the determination unit that the standard is satisfied, the device group risk information calculation unit calculates the device group risk information based on the risk information regarding the installation sites of the respective process devices constituting the target device group, and if it is determined by the determination unit that the standard is not satisfied, the device group risk information calculation unit acquires the device group risk information regarding another device group that has the device group information that matches or is similar to the device group information regarding the target device group at least to a predetermined degree, and for which it is determined by the determination unit that the standard is satisfied, and the device group risk information calculation unit takes the acquired device group risk information to be the device group risk information regarding the target device group.

In order to obtain accurate risk information that is focused on the installation site, it is preferable that a certain standard is satisfied, for example, it is preferable that there are diagnosis results regarding a certain number of process devices, and if diagnosis results regarding process devices constituting the device group for which calculation is to be performed do not satisfy the standard, accurate risk information cannot be obtained. However, the likelihood of malfunction of a device group depends on the configuration of the device group (the kind of respective devices, etc.) to some extent, and accordingly, even if the diagnosis results do not satisfy the standard, it is possible to estimate the likelihood of malfunction of the target device group to some extent from the likelihood of malfunction of a device group that matches or is similar to the configuration of the target device group. Therefore, according to this configuration, if the diagnosis results regarding the process devices constituting the device group for which calculation is to be performed do not satisfy the standard, the device group risk information regarding a device group that matches or is similar to the target device group and for which it is determined by the determination unit that the standard is satisfied is taken to be the device group risk information regarding the target device group, and therefore, even if the diagnosis results regarding the target device do not satisfy the standard, it is possible to assess risks more properly.

In one aspect, it is preferable that the device group information storage unit stores, as the device group information, a kind of the steam-utilizing device that constitutes the device group and an arrangement relationship between process devices that constitute the device group.

According to this configuration, the kind of the steam-utilizing device that is the primary part of the configuration of the device group and the arrangement relationship between the process devices are stored as the device group information, and therefore it is possible to properly determine whether or not the configurations of device groups match or are similar to each other, based on the device group information.

A risk assessment system according to the present disclosure is a risk assessment system for performing risk assessment of a steam plant that includes at least one device group that includes a steam-utilizing device that utilizes steam, a piping system that is connected to the steam-utilizing device, and process devices that are provided in the piping system, the risk assessment system including:

a diagnosis result storage unit that accumulatively stores diagnosis results of a plurality of diagnoses regarding each process device that is provided in the steam plant to be assessed, in association with installation sites of the process devices;

a risk information calculation unit configured to calculate risk information regarding a likelihood of malfunction of a process device that is provided at a target installation site, based on diagnosis results regarding process devices that are and have been provided at the target installation site; and a device group risk information calculation unit configured to calculate device group risk information regarding a likelihood of malfunction of a target device group among the at least one device group, based on the risk information regarding installation sites of respective process devices that constitute the target device group.

A risk assessment method according to the present disclosure is a risk assessment method for performing risk assessment of a steam plant that includes at least one device group that includes a steam-utilizing device that utilizes steam, a piping system that is connected to the steam-utilizing device, and process devices that are provided in the piping system, the risk assessment method being performed by a computer, and including:

a diagnosis result storing step of accumulatively storing diagnosis results of a plurality of diagnoses regarding each process device that is provided in the steam plant to be assessed, in association with installation sites of the process devices;

a risk information calculation step of calculating risk information regarding a likelihood of malfunction of a process device that is provided at a target installation site, based on diagnosis results regarding process devices that are and have been provided at the target installation site; and a device group risk information calculation step of calculating device group risk information regarding a likelihood of malfunction of a target device group among the at least one device group, based on the risk information regarding installation sites of respective process devices that constitute the target device group.

A risk assessment program according to the present disclosure is a risk assessment program for performing risk assessment of a steam plant that includes at least one device group that includes a steam-utilizing device that utilizes steam, a piping system that is connected to the steam-utilizing device, and process devices that are provided in the piping system, the risk assessment program causing a computer to perform:

a diagnosis result storing function of accumulatively storing diagnosis results of a plurality of diagnoses regarding each process device that is provided in the steam plant to be assessed, in association with installation sites of the process devices;

a risk information calculation function of calculating risk information regarding a likelihood of malfunction of a process device that is provided at a target installation site, based on diagnosis results regarding process devices that are and have been provided at the target installation site; and a device group risk information calculation function of calculating device group risk information regarding a likelihood of malfunction of a target device group among the at least one device group, based on the risk information regarding installation sites of respective process devices that constitute the target device group.

According to these configurations, functions and effects similar to those achieved by the above-described risk assessment device can be achieved.

A data structure according to the present disclosure is a data structure for performing risk assessment of a steam plant that includes at least one device group that includes a steam-utilizing device that utilizes steam, a piping system that is connected to the steam-utilizing device, and process devices that are provided in the piping system, the data structure including:

diagnosis result data that is constituted by diagnosis results of a plurality of diagnoses that are accumulatively stored regarding each process device that is provided in the steam plant to be assessed, in association with installation sites of the process devices;

risk information data that is constituted by risk information that indicates, for each installation site, a likelihood of malfunction of a process device that is provided at the installation site; and device group risk information data that is constituted by device group risk information that indicates, for each device group, a likelihood of malfunction of the device group, wherein the risk information data is updated when the diagnosis result data is updated, and the risk information is calculated based on the diagnosis results regarding process devices that are and have been provided at the installation site, and the device group risk information data is updated when the risk information data is updated, and the device group risk information is calculated based on the risk information regarding installation sites of respective process devices that constitute a target device group among the at least one device group.

According to this configuration, when the diagnosis result data is updated, the risk information data and the device group risk information data are also updated, and therefore it is possible to properly assess risks for each device group.

EMBODIMENT

The following describes embodiments of a risk assessment device, a risk assessment system, a risk assessment method, a risk assessment program, and a data structure according to the present disclosure with reference to the accompanying drawings. The following describes an example in which a risk assessment device according to this embodiment is incorporated into a plant monitoring system that monitors a steam plant 2, such as a petrochemical plant or a thermal power plant, that utilizes steam.

Figure 1:
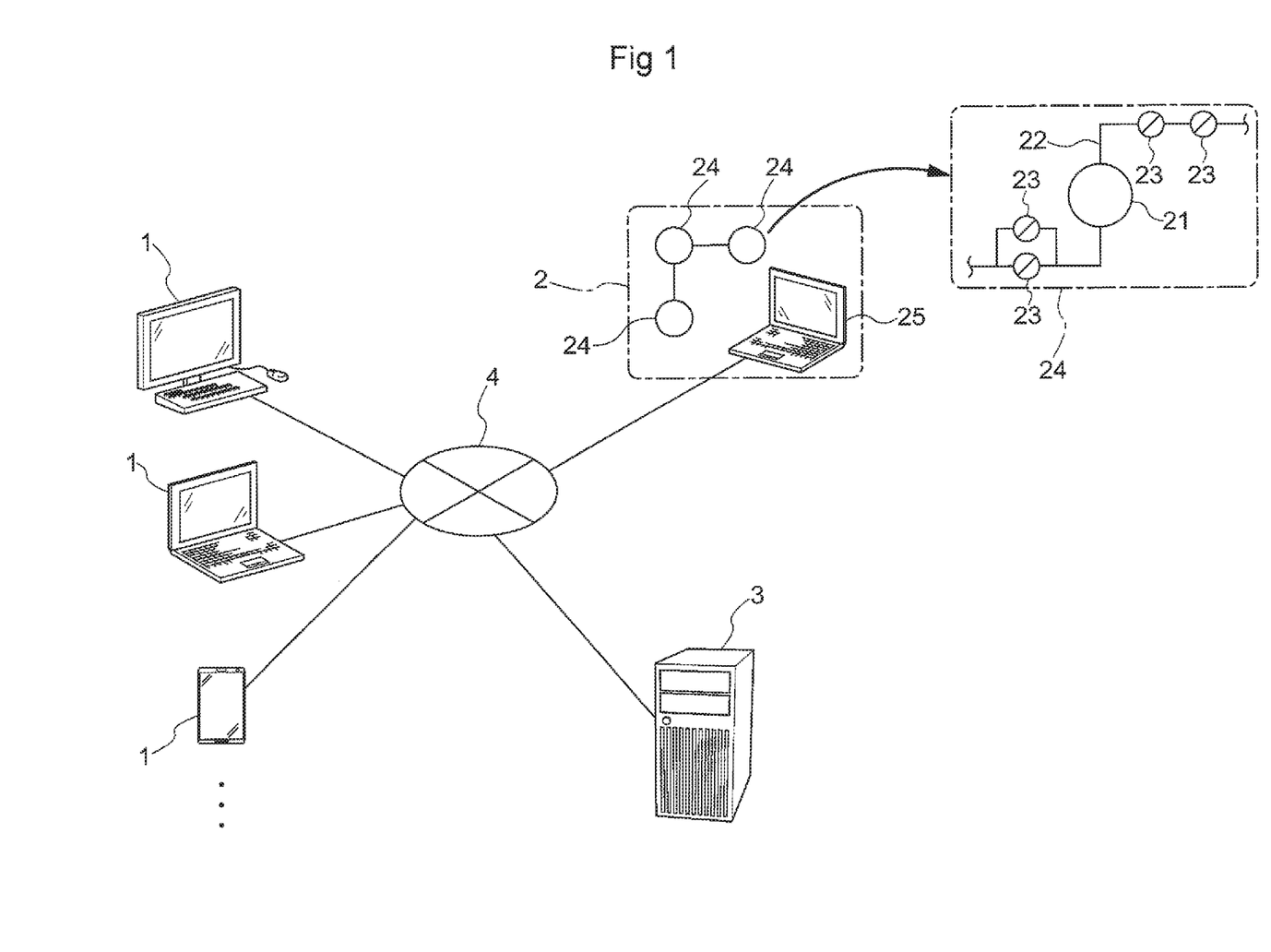
FIG. 1 is a schematic configuration diagram of a plant monitoring system according to this embodiment.

First, as shown in FIG. 1, in the plant monitoring system according to this embodiment, a monitoring server 3 that functions as the risk assessment device according to this embodiment collects data via a network 4 from various steam plants 2 to be monitored, and accumulatively stores the collected data in an internal database. The monitoring server 3 is configured to perform analysis and/or determination based on the collected data and/or data stored in the database, at a predetermined timing or in response to an instruction from a user and/or an administrator, and the result of the analysis or determination is transmitted to a user terminal 1, such as a PC or a smartphone, or the user accesses the monitoring server 3 via the user terminal 1, and thus the user can grasp the state of the plant 2. Further, the result of the analysis and/or determination is stored in the database and is used for further analysis and/or determination. It should be noted that, in this embodiment, a "piping system" is a concept that includes a whole steam system that is constituted by, for example, a steam trap, steam piping, various valves, and the like. If such a whole steam system is considered as one of the important assets, the risk assessment device, the risk assessment system, the risk assessment method, the risk assessment program, and the data structure according to this embodiment can be applied as one asset management technique.

The steam plant 2 includes, as constituent elements, steam-utilizing devices 21, such as a turbine, a compressor, and a heat exchanger, that utilize steam, piping systems 22 such as feeding pipes for feeding steam to the steam-utilizing devices 21 and drain pipes for discharging drainage generated in the steam-utilizing devices 21, process devices 23, such as steam traps, control valves, pumps, filters, and separators, that are provided in the piping systems 22, and the like. Accordingly, in the steam plant 2, one or more device groups 24 (each including a steam-utilizing device 21, a piping system 22 that is connected to the steam-utilizing device 21, and process devices 23 that are provided in the piping system 22) are respectively formed centered around the individual steam-utilizing devices 21 (or a plurality of steam-utilizing devices 21 that cooperate with each other to perform a series of processes) as shown in FIG. 1, and processes to be performed in the steam plant 2 are performed by the device groups 24 individually or in cooperation with each other.

The steam plant 2 also includes a monitoring device 25 that is constituted by a computer, such as a PC, that is capable of communicating with the monitoring server 3 via the network 4, and the steam plant 2 is configured such that the monitoring device 25 collects data regarding each constituent element of the steam plant 2 and transmits the collected data to the monitoring server 3. Thus, various kinds of data regarding each constituent element of the steam plant 2 is collected in the monitoring server 3, and the monitoring server 3 performs analysis or determination based on the data.

In particular, in this embodiment, the data collected from the constituent elements includes diagnosis results that indicate whether the process devices 23 are functioning properly. Specifically, inspection of the state of the process devices 23 and diagnosis based on the inspection are performed at predetermined intervals in the steam plant 2, and, in this embodiment, results of the diagnosis are collected by the monitoring device 25 and are transmitted to the monitoring server 3.

The following describes diagnosis performed on the process devices 23. The process devices 23 remove and discharge drainage and/or other impurities from steam flowing through the steam plant 2 or control flow of the steam, and are provided at respective positions in the piping system 22. If a process device 23 malfunctions, a loss may occur in operation of the steam plant 2, and if the malfunction is left as it is, the steam plant 2 may fail to operate. Therefore, diagnosis is repeatedly performed in the steam plant 2 at certain intervals by detecting the state (temperature, vibration, etc.) of each process device 23 using a portable inspection device (or, if a sensor is attached to the process device 23, using the sensor), and determining whether each process device 23 is functioning properly, based on detection results. If a malfunction of a process device 23 is found through diagnosis, the process device 23 is replaced or repaired, and thus the state of the steam plant 2 can be maintained favorably. It should be noted that intervals between diagnoses are set as appropriate according to the purpose, and, in some cases, the intervals are several months, one year, or shorter than these periods, or are changed according to the installation period of the process device 23, and the like.

In this embodiment, the detection results and/or the diagnosis results, such as the presence or absence of a malfunction, that are obtained for each process device 23 as described above are collected by the monitoring device 25 in association with identification information regarding the process device 23, and are transmitted to the monitoring server 3 every time diagnosis is performed. Such diagnosis results are transmitted from a plurality of steam plants 2 to the monitoring server 3, although this is not illustrated.

In this embodiment, the monitoring server 3 is configured to perform risk assessment of each steam plant 2, using the collected diagnosis results. Specifically, the monitoring server 3 is configured to perform risk assessment focusing on installation sites at which process devices 23 are installed, rather than the individual process devices 23, and further assess risks for each device group 24 based on the risk assessment. The following describes configurations provided in the monitoring server 3 to perform the risk assessment.

First, the monitoring server 3 is a common server device and includes common hardware configurations such as a communication interface for performing communication via the network 4, an input/output device for directly inputting data to and outputting data from the server device, a CPU that controls respective units of the server device, a HDD that is a large-capacity storage device that stores various kinds of data and/or programs, a memory that temporarily stores a program to be executed, and the like. In this embodiment, a risk assessment program for performing processing described later is stored in the HDD, and as a result of the risk assessment program, which is temporarily stored in the memory, being executed by the CPU, respective units of the monitoring server 3 function as a risk assessment device that includes functional units shown in FIG. 2.

Figure 2:
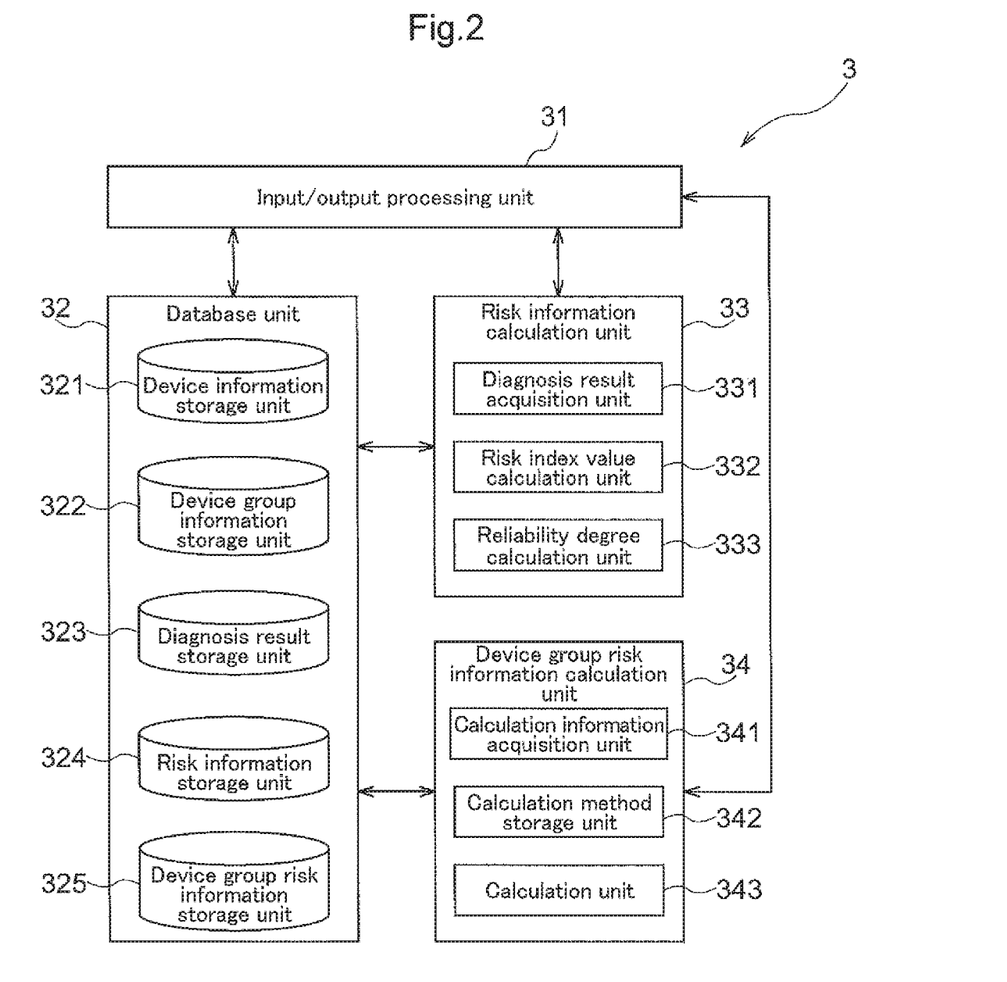
FIG. 2 is a block diagram of a risk assessment device.

Specifically, in this embodiment, as a result of the risk assessment program being executed, the monitoring server 3 functions as the risk assessment device that includes, as functional units, an input/output processing unit 31 that acquires data transmitted from the monitoring device 25, a database unit 32 that stores various kinds of data such as acquired data, a risk information calculation unit 33 that calculates risk information regarding the likelihood of malfunction of process devices 23, and a device group risk information calculation unit 34 that calculates device group risk information regarding the likelihood of malfunction of a target device group 24 (FIG. 2). The following describes respective functional units.

First, the input/output processing unit 31 functions as an interface of the risk assessment device. Specifically, the input/output processing unit is configured to perform various kinds of processing such as (a) acquiring data transmitted from the monitoring device 25 and storing the acquired data in the database unit 32, (b) accepting a request from a user, causing the risk information calculation unit 33 and/or the device group risk information calculation unit 34 to perform calculation, and outputting an assessment result according to the request to the user, and (c) editing and/or updating the database unit 32 in response to an instruction from the user.

The database unit 32 is configured to manage data for each steam plant 2, and includes a device information storage unit 321 that stores various kinds of information such as identification information regarding each constituent element of a target steam plant 2, a device group information storage unit 322 that stores, for each device group 24, device group information regarding the configuration of the device group 24, a diagnosis result storage unit 323 that stores diagnosis results regarding each process device 23, which are transmitted from the monitoring device 25, a risk information storage unit 324 that stores risk information calculated by the risk information calculation unit 33, and a device group risk information storage unit 325 that stores device group risk information calculated by the device group risk information calculation unit 34.

The device information storage unit 321 stores, with respect to each steam-utilizing device 21, for example, information regarding the class (a turbine, a compressor, a heat exchanger, etc.) and the type of the steam-utilizing device and information regarding the number of years from installation (the date and time of installation, etc.) in association with identification information regarding the steam-utilizing device 21. The device information storage unit 321 stores, with respect to each process device 23, for example, information regarding the class (a steam trap, a control valve, etc.) and the type of the process device, information regarding installation conditions (temperature and pressure of steam flowing therethrough, etc.) and the application, information regarding the number of years from installation (the date and time of installation, etc.), and information regarding the installation site (in this embodiment, identification information given to the installation site) in association with identification information regarding the process device 23. It should be noted that the device information storage unit 321 is configured to be edited and/or updated through the input/output processing unit 31 in response to an instruction from a user, and if a constituent element of the target steam plant 2 is replaced, for example, the device information storage unit can perform predetermined processing such as additionally creating items that relate to a post-replacement constituent element and storing new information regarding this constituent element. Even if information regarding a post-replacement device is stored, information regarding a pre-replacement device remains, and accordingly the device information storage unit 321 stores not only information regarding each constituent element that is currently provided in the steam plant 2 but also information regarding each constituent element that was provided in the steam plant 2 in the past.

The device group information storage unit 322 gives identification information to each device group 24 and stores, together with the identification information, identification information regarding each constituent element that constitutes the device group 24 (identification information regarding the installation site is also stored for each process device 23), the kind of each steam-utilizing device 21, each piping system 22, and each process device 23 that constitute the device group, the arrangement relationship between constituent elements, such as the arrangement relationship between process devices 23 constituting the target device group 24 (that is, the device group information storage unit 322 functions as an arrangement relationship storage unit that stores, for each device group 24, the arrangement relationship between process devices 23 constituting the device group 24), and the like.

The diagnosis result storage unit 323 accumulatively stores diagnosis results regarding respective process devices 23 every time diagnosis results are transmitted from the monitoring device 25. In the diagnosis result storage unit 323, data is managed for each of the installation sites at which the process devices 23 are installed in the target steam plant 2, rather than for each of the individual process devices 23. Specifically, the diagnosis result storage unit 323 is configured to accumulatively store, for each of the installation sites, diagnosis results regarding process devices 23 that are and have been provided at the installation site, together with identification information (hereinafter referred to as "device identification information") regarding the individual process devices 23, in association with identification information (hereinafter referred to as "installation site identification information") given to the installation site. Upon acquiring diagnosis results transmitted from the monitoring device 25, the input/output processing unit 31 additionally stores, in the diagnosis result storage unit 323, the diagnosis result regarding each process device 23 together with the device identification information regarding the process device 23, in association with installation site identification information that corresponds to the device identification information regarding the process device 23. Thus, the diagnosis result storage unit 323 is configured to accumulatively store diagnosis results of a plurality of diagnoses regarding each process device 23 provided in the target steam plant 2, in association with the installation sites of the process devices 23.

The risk information storage unit 324 stores risk information that is calculated by the risk information calculation unit 33 and indicates, for each installation site, the likelihood of malfunction of a process device 23 that is provided at the installation site. Specifically, in the risk information storage unit 324, the risk information calculated by the risk information calculation unit 33 is stored in association with installation site identification information.

The device group risk information storage unit 325 stores device group risk information that is calculated by the device group risk information calculation unit 34 and indicates, for each device group 24, the likelihood of malfunction of the device group 24. Specifically, in the device group risk information storage unit 325, the device group risk information calculated by the device group risk information calculation unit 34 is stored in association with identification information given to the corresponding device group 24.

As described above, the data structure of the database unit 32 includes: diagnosis result data that is constituted by diagnosis results of a plurality of diagnoses that are accumulatively stored with respect to each process device 23 provided in the target steam plant 2, in association with installation sites of the process devices 23; risk information data that is constituted by risk information that indicates, for each installation site, the likelihood of malfunction of a process device 23 that is provided at the installation site; and device group risk information data that is constituted by device group risk information that indicates, for each device group 24, the likelihood of malfunction of the device group 24.

The risk information calculation unit 33 calculates risk information regarding the likelihood of malfunction of a process device 23 that is provided at a target installation site, based on diagnosis results regarding process devices 23 that are and have been provided at the target installation site, of which diagnosis results are stored in the diagnosis result storage unit 323. Specifically, the risk information calculation unit 33 includes a diagnosis result acquisition unit 331 that acquires diagnosis results from the diagnosis result storage unit 323, a risk index value calculation unit 332 that calculates a risk index value that indicates the likelihood of malfunction of a process device 23 provided at an installation site, and a reliability degree calculation unit 333 that calculates the degree of reliability that indicates the degree to which the risk index value can be relied on as being accurate, and the risk information calculation unit is configured to calculate the risk index value and the degree of reliability as the risk information.

The diagnosis result acquisition unit 331 acquires diagnosis results from the diagnosis result storage unit 323, and acquires diagnosis results regarding an installation site for which calculation is to be performed.

With respect to the installation site for which the diagnosis results are acquired from the diagnosis result storage unit 323, the risk index value calculation unit 332 calculates a risk index value that indicates the likelihood of malfunction of a process device 23 that is provided at the installation site, according to a predetermined standard.

The risk index value is, for example, a numerical value that expresses the likelihood of malfunction within a given range such as 0 to 100 or 0 to 10, or a rank that is determined by ranking the risk at an installation site where malfunction rarely occurs as "low", the risk at an installation site where malfunction is likely to occur as "medium", and the risk at an installation site where malfunction is particularly likely to occur as "high", for example, and that is expressed using a character such as A, B, or C, or a symbol indicating such as "good", "average", or "poor", according to the result of ranking.

The risk index value is calculated by, for example, determining the number and/or the ratio of diagnoses in which the occurrence of malfunction was confirmed, with respect to a period and/or the number of diagnoses for which calculation is performed, or determining the number of process devices 23 that were installed at the installation site (or how many times replacement was performed) for that period, and taking the thus determined value itself to be the risk index value, or ranking the likelihood of malfunction according to the determined value and/or whether or not the determined value is larger than a predetermined threshold value. In expressing the likelihood of malfunction using a numerical value or in ranking, it is also possible to use one or more items as parameters out of items such as how many times malfunction occurred, the ratio and frequency of malfunction, the type of malfunction (if the process device 23 is a steam trap, leakage or clogging, for example), and the class and type of a device that malfunctioned.

The reliability degree calculation unit 333 calculates the degree of reliability that indicates the degree to which a risk index value calculated by the risk index value calculation unit 332 can be relied on as being accurate. That is, it can be said that a risk index value that is calculated using a large number of diagnosis data pieces has a small error and is more accurate, compared to a risk index value that is calculated using a small number of diagnosis data pieces. Therefore, as a point of view, it is also necessary to grasp the specific degree to which the calculated risk index value can be relied on, and accordingly the degree of reliability is calculated by the reliability degree calculation unit 333.

Similarly to the risk index value, the degree of reliability is, for example, a numerical value that expresses the degree to which the risk index value can be relied on, within a given range such as 0 to 100 or 0 to 10, or a rank that is determined by ranking the degree to which the risk index value can be relied on and is expressed using a character such as A, B, or C, or a symbol indicating such as "good", "average", or "poor".

In calculating the degree of reliability, the reliability degree calculation unit 333 expresses the degree to which the risk index value can be relied on using a numerical value or ranks the degree to which the risk index value can be relied on, based on numerical values that are determined with respect to one or more items. Although various items are used for calculating the degree of reliability, the following items 1 to 3 are used, for example.

First, the item 1 is the number of process devices 23 for which diagnosis results regarding the target installation site are stored. This is because, as the number of process devices 23 for which diagnosis results are stored increases, the accuracy of the calculated risk index value increases. That is, if results of 10 diagnoses are stored regarding the target installation site and the results include diagnosis results regarding four process devices 23 (this means that four process devices 23 were installed at the installation site during the period for which the 10 diagnoses were performed), the numerical value determined with respect to the item 1 is four.

Next, the item 2 is the frequency of diagnoses that were performed regarding the target installation site. This is because, as the frequency of diagnoses increases, periods passed before individual process devices 23 malfunctioned can be grasped more accurately. The frequency is expressed using such as intervals between diagnoses or an annual average of the number of diagnoses, and if diagnoses are performed at substantially constant intervals (for example, twice a year), for example, an interval or the annual average is taken as the numerical value determined with respect to the item 2. If intervals between diagnoses vary, the annual average can be taken as the numerical value determined with respect to the item 2. For example, if 12 diagnoses are performed in three years, the annual average of the number of diagnoses is four. It should be noted that, if diagnoses are performed at intervals that are equal to or longer than one year, the annual average is equal to or smaller than one.

The item 3 is a variation among diagnosis results regarding the target installation site. This is because it can be said that the smaller the variation among the obtained diagnosis results is, the more accurate the calculated risk index value is. The variation can be determined using a statistical technique and a standard deviation can be used, for example.

If the above-described items 1 to 3 are used, as the numerical value determined with respect to the item 1 increases, the number of process devices 23 for which diagnosis results are stored increases and the degree to which the risk index value can be relied on increases. If the item 2 is an interval, as the numerical value decreases, the frequency of diagnoses increases and the degree to which the risk index value can be relied on increases. If the item 2 is an annual average, as the numerical value increases, the frequency of diagnoses increases and the degree to which the risk index value can be relied on increases. If the item 3 is a standard deviation, as the numerical value decreases, the variation among diagnosis results decreases and the degree to which the risk index value can be relied on increases. Based on the above-described relationship between the magnitude of a numerical value determined with respect to each item and the degree to which the risk index value can be relied on, the reliability degree calculation unit 333 expresses the degree to which the risk index value can be relied on using a numerical value or ranks the degree to which the risk index value can be relied on, using the one or more items and based on predetermined standards. Alternatively, the reliability degree calculation unit 333 may determine a numerical value itself, which is determined with respect to any one or more of the items, as the degree of reliability.

The risk information calculation unit 33 is configured to store, in the risk information storage unit 324, the risk index value and the degree of reliability that are calculated as described above, as the risk information in association with installation site identification information. Thus, risk information is stored for each of the installation sites of the process devices 23, in the risk information storage unit 324.

The device group risk information calculation unit 34 calculates device group risk information regarding the likelihood of malfunction of a target device group 24, based on risk information regarding installation sites of respective process devices 23 that constitute the target device group 24, and includes a calculation information acquisition unit 341, a calculation method storage unit 342, and a calculation unit 343. That is, in the case of a device group 24 that includes a steam-utilizing device 21, a piping system 22, and process devices 23, malfunction of the process devices 23, which affects steam flowing into the steam-utilizing device 21 or flowing from the steam-utilizing device 21, is a dominant factor in assessing the likelihood of malfunction of the device group 24. Further, the likelihood of malfunction of each process device 23 is also affected by the environment of the site at which the process device is installed. Therefore, the device group risk information calculation unit 34 is configured to calculate risk information regarding the target device group 24 based on risk information that is focused on the installation sites of the respective process devices 23 constituting the target device group 24.

The calculation information acquisition unit 341 acquires information that is necessary for calculating the device group risk information from the database unit 32, and acquires the kind of the steam-utilizing device 21 constituting the device group 24 for which calculation is to be performed, device group information such as the arrangement relationship between the process devices 23 constituting the device group 24, and risk information regarding each of the process devices 23 constituting the device group 24.

The calculation method storage unit 342 stores calculation methods for calculating the device group risk information according to the arrangement relationship between the process devices 23 constituting the device group 24 for which calculation is to be performed. In this embodiment, a device group risk index value that indicates the likelihood of malfunction of the target device group 24 is calculated as the device group risk information, and, in order to calculate the device group risk index value, the calculation method storage unit stores calculation methods for calculating a risk index value of a process device group that is included in the device group 24 and is constituted by one piping system 22 and a plurality of process devices 23 that are provided in the piping system 22. Specifically, the calculation method storage unit stores a parallel calculation method for cases where the process devices 23 are in a parallel relationship to each other and a series calculation method for cases where the process devices 23 are in a series relationship to each other. For example, in this embodiment, risk index values of respective process devices 23 are standardized for calculation, and according to the parallel calculation method, the risk index value of the process device group is calculated by multiplying the standardized risk index values of respective process devices 23 that are in a parallel relationship to each other, and according to the series calculation method, the largest risk index value out of the standardized risk index values of respective process devices 23 that are in a series relationship to each other is taken to be the risk index value of the process device group. It should be noted that the risk index values are not necessarily suited for calculation because they are expressed in forms that facilitate understanding, and therefore the risk index values are standardized to be suited for calculation. For example, if the risk index values are numerical values expressing the likelihood of malfunction, the risk index values are normalized, and if the risk index values are ranks that indicate the likelihood of malfunction, the risk index values are converted into numerical values according to rank.

The calculation unit 343 calculates the device group risk information regarding the target device group 24, using a calculation method that corresponds to the arrangement relationship between the process devices 23 constituting the target device group 24, which is acquired by the calculation information acquisition unit 341. Specifically, the calculation unit is configured to calculate a risk index value for each process device group (a group of process devices 23 that are provided in the same piping system 22, such as a group 26A or 26B in FIG. 3) that constitutes the device group 24, using a corresponding calculation method, and then calculate the device group risk index value based on the calculated risk index values of respective process device groups. For example, if process devices 23 that belong to a process device group are in a parallel relationship to each other, the calculation unit calculates the risk index value of the process device group by multiplying standardized risk index values, and if process devices 23 that belong to a process device group are in a series relationship to each other, the calculation unit takes the largest risk index value out of the standardized risk index values to be the standardized risk index value of the process device group. For example, when the standardized risk index values are represented by $P_1$, $P_2$, and $P_3$, according to the parallel calculation method, the risk index value of the process device group is $P=(P_1 \times P_2 \times P_3)$, and according to the series calculation method, the risk index value of the process device group is $P=\max(P_1, P_2, P_3)$.

As in the case of the piping system 22B of the device group 24 shown in FIG. 3, if a group (referred to below as a "parallel device group") of process devices 23D and 23E that are in a parallel arrangement relationship to each other and another process device 23F that is not included in the parallel device group are provided in the single piping system 22B, or a plurality of parallel device groups are provided in a single piping system, the risk index value of the process device group cannot be calculated using only one of the above-described parallel calculation method and series calculation method. Therefore, in this embodiment, the calculation method storage unit 342 also stores a calculation method for such a case, and the calculation unit 343 is configured to calculate the risk index value of the process device group based on the calculation method as described below. First, the calculation unit 343 calculates the risk index value for each parallel device group, based on the parallel calculation method and using standardized risk index values of individual process devices 23 that constitute the parallel device group. Then, the calculation unit calculates the risk index value of the process device group, based on the series calculation method and using the risk index values of respective parallel device groups, or the risk index values of one or more parallel device groups and the risk index value of another process device 23.

Figure 3:
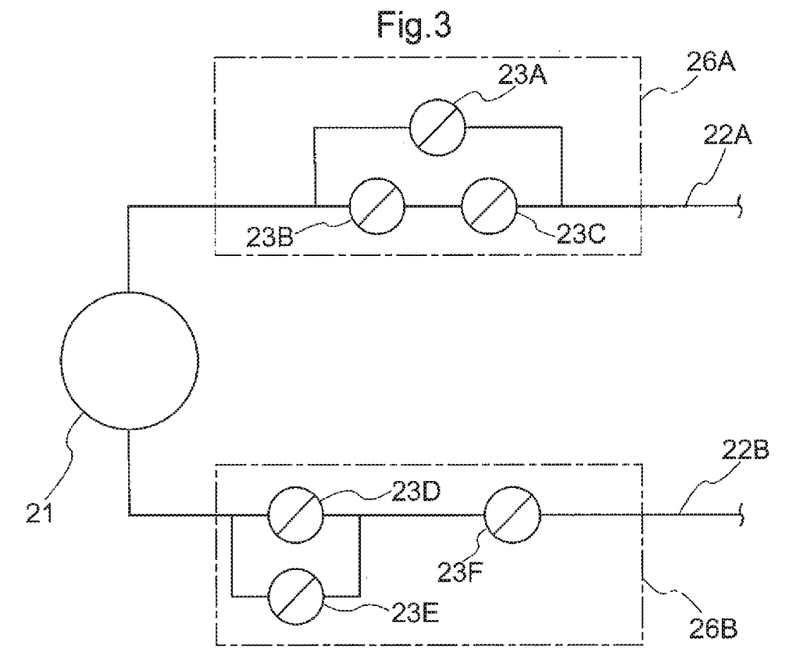
FIG. 3 is a schematic diagram showing one example of device groups.

For example, in the case of the process device group 26B shown in FIG. 3, which is constituted by the piping system 22B and the process devices 23D to 23F provided in the piping system 22B, when the standardized risk index values of the process devices 23D to 23F are respectively represented by $P_D$, $P_E$, and $P_F$, the calculation unit 343 calculates the risk index value $P_{DE}$ of the parallel device group constituted by the process devices 23D and 23E based on the parallel calculation method using the following expression: $P_{DE}=(P_D \times P_E)$, and then calculates the risk index value $P_{DEF}$ of the process device group 26B from the risk index value $P_{DE}$ of the parallel device group and the standardized risk index value $P_E$ of the process device 23F using the following expression: $P_{DEF}=\max((P_D \times P_E), P_F)$.

Further, as in the case of the piping system 22A of the device group 24 shown in FIG. 3, if there is a parallel device group (process devices 23A to 23C) and lines in the parallel device group include a line on which there is a group (referred to below as a "sub series device group") of target process devices 23B and 23C that are in a series arrangement relationship to each other, the risk index value of the process device group cannot be calculated using only one of the parallel calculation method and the series calculation method. Therefore, in this embodiment, the calculation method storage unit 342 also stores a calculation method for such a case, and the calculation unit 343 is configured to calculate the risk index value of the process device group based on the calculation method as described below. First, the calculation unit 343 calculates, for each line on which there is a sub series device group, the risk index value of the sub series device group, based on the series calculation method and using standardized risk index values of respective process devices 23 that constitute the sub series device group. Then, the calculation unit calculates the risk index value of the parallel device group, based on the parallel calculation method and using the risk index value of each sub series device group and, if there is a process device 23 that does not belong to any sub series device group, using the risk index value of the process device.

For example, in the case of the process device group 26A shown in FIG. 3, which is constituted by the piping system 22A and the process devices 23A to 23C provided in the piping system 22A, when the standardized risk index values of the process devices 23A to 23C are respectively represented by $P_A$, $P_B$, and $P_C$, the calculation unit 343 calculates the risk index value $P_BC$ of the sub series device group constituted by the process devices 23B and 23C based on the series calculation method using the following expression: $P_BC=\max(P_B, P_C)$. Further, the calculation unit 343 calculates the risk index value $P_{ABC}$ of the process device group 26A constituted by the process devices 23A to 23C based on the parallel calculation method using the following expression: $P_{ABC}=(P_A \times \max(P_B, P_C))$. It should be noted that, if sub series device groups are respectively provided on lines that are in a parallel relationship to each other in a parallel device group, the calculation unit 343 calculates the risk index value for each sub series device group, and then calculates the risk index value of the parallel device group based on the parallel calculation method, considering each sub series device group as a unit.

The calculation unit 343 calculates the device group risk index value based on the risk index values of respective process device groups, which are calculated as described above. The calculation may be performed by simply multiplying the risk index values of the respective process device groups or determining the largest risk index value out of the risk index values. Alternatively, a calculation method may be determined taking the arrangement relationship into consideration, and the risk index value may be calculated using the calculation method according to the arrangement relationship. A configuration is also possible in which, not only the risk index values of the respective process device groups, but also the risk index value of the steam-utilizing device 21 is calculated, and the device group risk information is calculated using the risk index value of the steam-utilizing device 21 as well. In this case, the risk index value of the steam-utilizing device 21 can be calculated by, for example, calculating the probability of malfunction of the target steam-utilizing device 21, based on information that is stored in the device information storage unit 321 and using a database in which expressions and parameters for calculating the probability of malfunction are stored for each kind of steam-utilizing device 21, and calculating the risk index value of the steam-utilizing device 21 from the probability of malfunction. Alternatively, the risk index value of the steam-utilizing device 21 may be set simply based on the degree of influence that will be exerted on the operation of the steam plant 2 when the steam-utilizing device malfunctions. For example, the risk index value may be set to a large value if the steam-utilizing device is used as the main device, and set to a small value if the steam-utilizing device is used as a subsidiary device.

The device group risk information calculation unit 34 may also calculate, as the device group risk information, the degree of reliability that indicates the degree to which the device group risk index value can be relied on as being accurate. If the degree of reliability is common between the process devices 23 constituting the target device group 24, the degree of reliability regarding the process devices 23 can be taken to be the degree of reliability regarding the device group 24, and if the degree of reliability differs between the process devices 23, an average value of the degrees of reliability regarding the respective process devices 23 or the lowest degree of reliability out of the degrees of reliability regarding the respective process devices 23 can be taken to be the degree of reliability regarding the device group 24.

The device group risk information calculation unit 34 is configured to store, in the device group risk information storage unit 325, the device group risk information (the device group risk index value and the degree of reliability) calculated as described above, in association with the device group identification information.

In this embodiment, every time the diagnosis result storage unit 323 is updated (that is, every time new diagnosis results transmitted from the monitoring device 25 are stored), the risk information calculation unit 33 recalculates the risk index values and the degrees of reliability and stores new risk index values and new degrees of reliability in the risk information storage unit 324, and every time the risk information storage unit 324 is updated (that is, every time new risk index values and new degrees of reliability are stored), the device group risk information calculation unit 34 recalculates the device group risk information. Accordingly, in the database unit 32, the risk information data stored in the risk information storage unit 324 is updated when the diagnosis result data is updated, and the device group risk information data stored in the device group risk information storage unit 325 is updated when the risk information data is updated.

As described above, in the monitoring server 3, risk information regarding each steam plant 2 is stored in the database unit 32 based on collected diagnosis results, through execution of (1) a diagnosis result storing step of accumulatively storing results of a plurality of diagnoses regarding each process device 23 provided in the target steam plant 2, in association with installation sites of the process devices 23, (2) a risk information calculation step of calculating risk information (in this embodiment, the risk index value and the degree of reliability) regarding the likelihood of malfunction of a process device 23 provided at a target installation site, based on diagnosis results regarding process devices 23 that are and have been provided at the target installation site, and (3) a device group risk information calculation step of calculating device group risk information regarding the likelihood of malfunction of a target device group 24, based on the risk information regarding installation sites of respective process devices 23 that constitute the target device group 24. When the user requests risk information from the monitoring server 3, an assessment result according to the request is output via the input/output processing unit 31 to the user, and the user can assess risks of the target steam plant 2.

Figure 4:
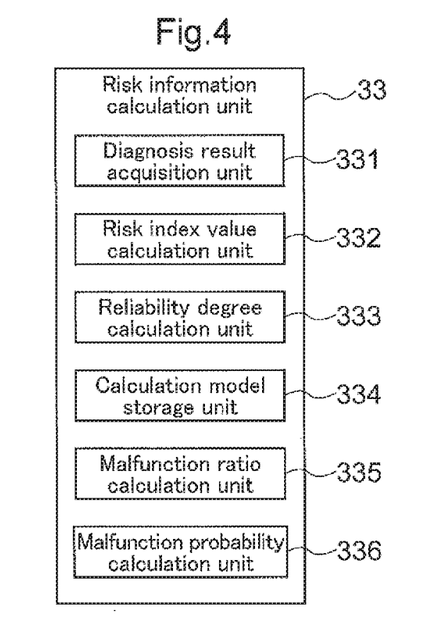
FIG. 4 is a block diagram showing one example of a risk information calculation unit.

If a calculation model for calculating the probability of malfunction of a process device 23 is determined, a configuration is also possible, as an additional configuration, in which the risk information calculation unit 33 is configured as shown in FIG. 4 and the risk index value is calculated through comparison between a probability of malfunction that is calculated using the calculation model and a malfunction ratio that is based on diagnosis results regarding process devices 23 that are and have been provided at the target installation site.

Compared to the risk information calculation unit shown in FIG. 2, the risk information calculation unit 33 shown in FIG. 4 further includes a calculation model storage unit 334 that stores a calculation model for calculating the probability of malfunction, a malfunction ratio calculation unit 335 that calculates, with respect to an installation site, a malfunction ratio that is the ratio of process devices 23 that had malfunctioned by the time a reference period had elapsed, based on diagnosis results, and a malfunction probability calculation unit 336 that calculates the probability of malfunction based on the calculation model, and the risk index value calculation unit 332 is configured to calculate the risk index value through comparison between the calculated malfunction ratio and the calculated probability of malfunction.

The calculation model storage unit 334 stores a calculation model for calculating the probability of malfunction of a target process device 23, based on the installation period of the target process device 23. For example, if data regarding the number of years passed before malfunction is available not only for process devices 23 provided in the target steam plant 2 but also for process devices 23 provided in a large number of steam plants, it is possible to obtain, using a statistical technique, a calculation model for calculating the probability of malfunction of a target process device 23, using the installation period as a parameter. The calculation model storage unit 334 stores such a calculation model. Although the calculation model stored in the calculation model storage unit 334 may be a simple model that uses only the installation period as the parameter, the calculation model may be a detailed model that uses, in addition to the installation period, one or more items relating to the kind of the process device 23, such as the type, application, or the like of the process device 23, which are stored in the device information storage unit 321, as parameters. If a detailed calculation model is used, it is possible to calculate the probability of malfunction according to the kind of the process device 23, based on various kinds of information stored in the device information storage unit 321, and accordingly an accurate probability of malfunction can be obtained. If the calculation model is determined for each kind of process device 23, for example, for each class or type of process device 23, the calculation model storage unit 334 stores the calculation model for each kind of process device 23.

Based on diagnosis results regarding process devices 23 that are and have been provided at the target installation site, the malfunction ratio calculation unit 335 calculates a malfunction ratio that is the ratio of process devices 23, out of the process devices 23 that are and have been provided at the target installation site, that had malfunctioned by the time a reference period had elapsed from when the process devices were installed at the target installation site. For example, assuming that five process devices 23 were installed at the target installation site, diagnosis was performed at every half-year, and according to the diagnosis results, two process devices were malfunctioning when two years elapsed, one process device was malfunctioning when two and a half years elapsed, one process device was malfunctioning when three years elapsed, and one process device was malfunctioning when four years elapsed, if the reference period is three years, four process devices out of the five process devices had malfunctioned by the time the reference period had elapsed, and the malfunction ratio is 80%. Thus, the malfunction ratio calculation unit 335 calculates the malfunction ratio with respect to the reference period, for each installation site. The reference period needs to be at least longer than intervals between diagnoses, but is not specifically limited, and can be set as appropriate according to the target installation site.

The malfunction probability calculation unit 336 calculates the probability that a process device 23 provided at the target installation site will malfunction within the reference period, based on the calculation model stored in the calculation model storage unit 334. Specifically, for example, the malfunction probability calculation unit extracts, from the device information storage unit 321, items that serve as parameters of the calculation model, with respect to the process device 23 provided at the target installation site, and calculates the probability of malfunction within the reference period based on the extracted data. If the calculation model storage unit 334 stores the calculation model for each kind of process device, for example, for each class or type of process device, the malfunction probability calculation unit 336 calculates the probability of malfunction using a calculation model that corresponds to the target process device 23.

The risk index value calculation unit 332 is configured to calculate the risk index value of the process device 23 provided at the target installation site through comparison between the calculated malfunction ratio and the calculated probability of malfunction. That is, the probability of malfunction calculated based on the calculation model by the malfunction probability calculation unit 336 is a general probability, and does not reflect influences that are derived from and are characteristic to the environment of the installation site at which the target process device 23 is installed. On the other hand, the malfunction ratio calculated by the malfunction ratio calculation unit 335 indicates the likelihood of malfunction of the process device that is determined while taking the environment of the installation site into consideration. Accordingly, if the malfunction ratio is higher than the probability of malfunction, it can be said that the environment of the installation site largely affects the likelihood of malfunction of the process device 23. Therefore, the risk index value calculation unit 332 is configured to specify installation sites that largely affect the likelihood of malfunction of process devices 23 by comparing the malfunction ratio with the probability of malfunction, and identify installation sites at which malfunction is likely to occur.

If the malfunction ratio is higher than the probability of malfunction, this may be because of an error, and therefore, if the malfunction ratio is higher than the probability of malfunction by at least a predetermined value, the risk index value calculation unit 332 calculates the risk index value, presuming that the installation site affects the likelihood of malfunction of the target process device 23. That is, the risk index value calculation unit 332 is configured to calculate the risk index value based on the degree of difference between the malfunction ratio and the probability of malfunction, rather than merely determining which of the malfunction ratio and the probability of malfunction is higher. A configuration is also possible in which a plurality of threshold values are set to calculate the risk index value, and the likelihood of malfunction is ranked according to the degree of difference between the malfunction ratio and the probability of malfunction.

If process devices 23 for which diagnosis results are stored include a plurality of kinds of process devices 23, such as process devices 23 of different classes or types, it is preferable that the malfunction ratio and the probability of malfunction are calculated and are compared with each other for each kind of process device 23. Therefore, if the process devices 23 that are and have been provided at the target installation site include a plurality of kinds of process devices 23, the malfunction ratio calculation unit 335 calculates the malfunction ratio for each kind of process device, the malfunction probability calculation unit 336 calculates the probability of malfunction for each kind of process device, and the risk index value calculation unit 332 calculates the risk index value at the target installation site, comparing the calculated malfunction ratio with the calculated probability of malfunction for each kind of process device.

As described above, in the risk index value calculation unit 332 shown in FIG. 4, the risk index value is calculated for each target installation site through execution of:

(1) a calculation model storing step of storing a calculation model for calculating the probability of malfunction of a target process device 23 based on the installation period of the target process device 23;

(2) a malfunction ratio calculation step of calculating, based on diagnosis results regarding process devices 23 that are and have been provided at the target installation site, the malfunction ratio that is the ratio of process devices 23, out of the process devices 23 that are and have been provided at the target installation site, that had malfunctioned by the time a predetermined period had elapsed from when the process devices were installed at the target installation site;

(3) a malfunction probability calculation step of calculating, based on the calculation model, the probability that a process device 23 provided at the target installation site will malfunction within the predetermined period; and (4) a risk index value calculation step of calculating the risk index value that indicates the likelihood of malfunction of the process device 23 provided at the target installation site, through comparison between the malfunction ratio and the calculated probability of malfunction.

Figure 5:
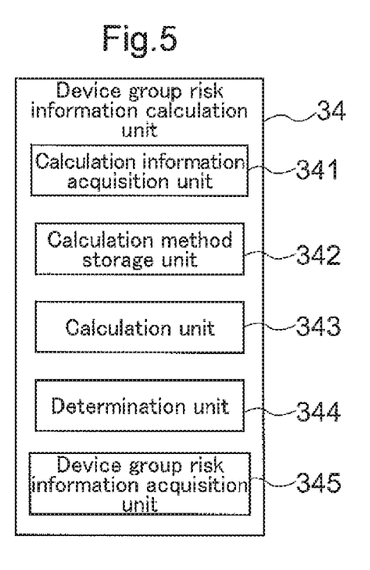
FIG. 5 is a block diagram showing one example of a device group risk information calculation unit.

Further, a configuration is also possible, as an additional configuration, in which the device group risk information calculation unit 34 is configured as shown in FIG. 5 and if diagnosis results regarding a target device group 24 do not satisfy a standard, device group risk information regarding a device group 24 that matches or is similar to the target device group 24 is acquired as device group risk information regarding the target device group 24. This configuration is for the following reasons. In order to obtain accurate risk information that is focused on the installation site, it is preferable that a certain standard is satisfied, for example, it is preferable that there are diagnosis results regarding a certain number of process devices 23, and if diagnosis results regarding process devices 23 constituting the device group 24 for which calculation is to be performed do not satisfy the standard, accurate risk information cannot be obtained. However, the likelihood of malfunction of a device group 24 depends on the configuration of the device group 24 (the kind of respective devices, the arrangement relationship, etc.) to some extent, and accordingly it is possible to estimate the likelihood of malfunction of the target device group 24 to some extent from the likelihood of malfunction of a device group 24 that matches or is similar to the target device group 24. Therefore, if the device group risk information calculation unit 34 is configured as shown in FIG. 5 and device group risk information regarding a device group 24 that matches or is similar to the target device group 24 is acquired as the device group risk information regarding the target device group 24, it is possible to properly assess risks of the target device group 24.

Compared to the device group risk information calculation unit shown in FIG. 2, the device group risk information calculation unit 34 shown in FIG. 5 further includes a determination unit 344 that determines whether or not diagnosis results regarding process devices 23 constituting the device group 24 for which calculation is to be performed satisfy a standard, and a device group risk information acquisition unit 345 that acquires device group risk information regarding a device group 24 that is similar to the target device group 24.

The determination unit 344 determines whether or not diagnosis results that are accumulated with respect to each process device 23 constituting the target device group 24 satisfy a predetermined standard. The determination unit 344 determines, for example, whether or not the accumulated diagnosis results satisfy predetermined standards in terms of one or more items, such as the number of diagnoses, the number of process devices 23 for which diagnosis results are stored, the frequency of diagnosis, and a variation among diagnosis results. The items used for the determination are not specifically limited, and the determination unit 344 may use, as the items, the degrees of reliability that are stored in the risk information storage unit 324 in association with the respective process devices 23, and the degree of reliability that is stored in the device group risk information storage unit 325 in association with the target device group 24, and determine whether or not the degrees of reliability satisfy a predetermined standard.

If it is determined by the determination unit 344 that the standard is not satisfied, the device group risk information acquisition unit 345 acquires device group risk information regarding another device group 24 that has device group information that matches or is similar to the device group information regarding the target device group 24 at least to a predetermined degree, and for which it is determined by the determination unit 344 that the standard is satisfied, and takes the acquired device group risk information to be the device group risk information regarding the target device group 24.

Specifically, in this embodiment, the device group risk information acquisition unit 345 compares the device group information regarding the target device group 24, which is acquired by the calculation information acquisition unit 341, with device group information regarding other device groups 24, which is stored in the device group information storage unit 322, and extracts, from the device group information storage unit 322, identification information regarding another device group 24 that matches or is similar to the device group information regarding the target device group 24 at least to a predetermined degree, and identification information regarding process devices 23 that constitute the other device group 24. It should be noted that, although items that are used in comparing the device group information are not specifically limited, in this embodiment, the comparison is performed in terms of the kinds of the steam-utilizing device 21 and the process devices 23 constituting the device group 24, and the arrangement relationship between the process devices 23 constituting the device group 24, for example. If there are a plurality of other device groups 24 that match or are similar to the device group information regarding the target device group 24 at least to the predetermined degree, identification information regarding all of these device groups 24 and identification information regarding process devices 23 that constitute these device groups 24 are extracted.

Further, the device group risk information acquisition unit 345 determines whether or not the degrees of reliability regarding the device groups 24 and the process devices 23 that correspond to the extracted identification information satisfy a standard, referring to the device group risk information storage unit 325 and the risk information storage unit 324, and acquires device group risk information regarding a device group 24 for which it is determined that the standard is satisfied. If there are a plurality of other device groups 24 that match or are similar to the device group information regarding the target device group 24 at least to the predetermined degree and it is determined, for a plurality of device groups 24 among the other device groups 24, that the degrees of reliability regarding the corresponding device groups 24 and the corresponding process devices 23 satisfy the standard, device group risk information is acquired with respect to a device group 24 that has device group information that matches or is the most similar to the device group information regarding the target device group 24, or a device group 24 that has the highest degree of reliability.

The device group risk information acquisition unit 345 stores, in the device group risk information storage unit 325, the acquired device group risk information as the device group risk information regarding the target device group 24, in association with the device group identification information. In this case, the device group risk information storage unit 325 stores the device group risk information such that it is possible to identify whether the device group risk information is acquired by the device group risk information acquisition unit 345 or is calculated by the calculation unit 343.

In the device group risk information calculation unit 34 shown in FIG. 5, first, the determination unit 344 performs determination based on information acquired by the calculation information acquisition unit 341, and if it is determined by the determination unit 344 that the standard is satisfied, the calculation unit 343 calculates device group risk information based on risk information regarding installation sites of respective process devices 23 that constitute the target device group 24, and if it is determined by the determination unit 344 that the standard is not satisfied, the device group risk information acquisition unit 345 acquires device group risk information.

Other Embodiments

Finally, other embodiments of the risk assessment device, the risk assessment system, the risk assessment method, the risk assessment program, and the data structure according to the present disclosure will be described. It should be noted that configurations disclosed in the following embodiments are also applicable in combination with configurations disclosed in other embodiments so long as no contradiction is incurred.

(1) In the above-described embodiment, a configuration is described as an example in which the single monitoring server 3 performs the series of processing. However, embodiments of the present disclosure are not limited to this configuration, and a risk assessment system that is constituted by a plurality of devices may be used, and processing performed by the monitoring server 3 may be distributed between the plurality of devices. For example, a configuration is also possible in which information, such as diagnosis results and risk information, that is stored in the database unit 32 in the above embodiment is stored in one or more external database servers, and the monitoring server 3 acquires information from the database servers, as necessary, to perform calculation.

(2) The calculation processing performed by the risk information calculation unit 33 and the device group risk information calculation unit 34 as described in the above embodiment is a mere example, and can be changed as appropriate according to the purpose. For example, the risk information calculation unit 33 may calculate only the risk index value as the risk information without calculating the degree of reliability.

(3) Regarding other configurations, the embodiments disclosed in the present description are mere examples in all respects, and it should be understood that the scope of the present disclosure is not limited by the embodiments. It should be easy for a person skilled in the art to understand that it is possible to apply modifications as appropriate without departing from the spirit of the present disclosure. Therefore, as a matter of course, other embodiments that are modified without departing from the spirit of the present disclosure are included in the scope of the present disclosure.

INDUSTRIAL APPLICABILITY

The present disclosure is applicable to risk assessment of a plant, for example.

DESCRIPTION OF REFERENCE SIGNS

2: Steam plant
21: Steam-utilizing device
22: Piping system
23: Process device
24: Device group
3: Monitoring server (Risk assessment device)
322: Device group information storage unit (Arrangement relationship storage unit)
323: Diagnosis result storage unit
33: Risk information calculation unit
34: Device group risk information calculation unit
342: Calculation method storage unit
344: Determination unit

The invention claimed is:

1. A risk assessment device for performing risk assessment of a steam plant that includes at least one device group that includes a steam-utilizing device that utilizes steam, a piping system that is connected to the steam-utilizing device, and process devices that are provided in the piping system, the risk assessment device comprising:
   a diagnosis result storage unit that accumulatively stores diagnosis results of a plurality of diagnoses regarding each process device that is provided in the steam plant to be assessed, in association with installation sites of the process devices;
   a risk information calculation unit configured to calculate risk information regarding a likelihood of malfunction of a process device that is provided at a target installation site, based on diagnosis results regarding process devices that are provided at the target installation site; and
   a device group risk information calculation unit configured to calculate device group risk information regarding a likelihood of malfunction of a target device group among the at least one device group, based on the risk information regarding installation sites of respective process devices that constitute the target device group.

2. The risk assessment device according to claim 1, further comprising:
   an arrangement relationship storage unit that stores, for each device group, an arrangement relationship between process devices that constitute the device group; and
   a calculation method storage unit that stores a calculation method for calculating the device group risk information according to an arrangement relationship between process devices constituting the device group,
   wherein the device group risk information calculation unit calculates the device group risk information regarding the target device group, using the calculation method that corresponds to an arrangement relationship between process devices constituting the target device group.

3. The risk assessment device according to claim 2, further comprising:
   a device group information storage unit that stores, for each device group, device group information regarding a configuration of the device group; and
   a determination unit configured to determine, with respect to the target device group, whether or not the diagnosis results accumulated with respect to each process device constituting the target device group satisfy a predetermined standard,
   wherein, if it is determined by the determination unit that the standard is satisfied, the device group risk information calculation unit calculates the device group risk information based on the risk information regarding the installation sites of the respective process devices constituting the target device group, and if it is determined by the determination unit that the standard is not satisfied, the device group risk information calculation unit acquires the device group risk information regarding another device group that has the device group information that matches or is similar to the device group information regarding the target device group at least to a predetermined degree, and for which it is determined by the determination unit that the standard is satisfied, and the device group risk information calculation unit takes the acquired device group risk information to be the device group risk information regarding the target device group.

4. The risk assessment device according to claim 3, wherein the device group information storage unit stores, as the device group information, a kind of the steam-utilizing device that constitutes the device group and an arrangement relationship between process devices that constitute the device group.

5. A risk assessment system for performing risk assessment of a steam plant that includes at least one device group that includes a steam-utilizing device that utilizes steam, a piping system that is connected to the steam-utilizing device, and process devices that are provided in the piping system, the risk assessment system comprising:

a diagnosis result storage unit that accumulatively stores diagnosis results of a plurality of diagnoses regarding each process device that is provided in the steam plant to be assessed, in association with installation sites of the process devices;

a risk information calculation unit configured to calculate risk information regarding a likelihood of malfunction of a process device that is provided at a target installation site, based on diagnosis results regarding process devices that are provided at the target installation site; and a device group risk information calculation unit configured to calculate device group risk information regarding a likelihood of malfunction of a target device group among the at least one device group, based on the risk information regarding installation sites of respective process devices that constitute the target device group.

6. A risk assessment method for performing risk assessment of a steam plant that includes at least one device group that includes a steam-utilizing device that utilizes steam, a piping system that is connected to the steam-utilizing device, and process devices that are provided in the piping system, the risk assessment method being performed by a computer, and comprising:

a diagnosis result storing step of accumulatively storing diagnosis results of a plurality of diagnoses regarding each process device that is provided in the steam plant to be assessed, in association with installation sites of the process devices;

a risk information calculation step of calculating risk information regarding a likelihood of malfunction of a process device that is provided at a target installation site, based on diagnosis results regarding process devices that are provided at the target installation site; and a device group risk information calculation step of calculating device group risk information regarding a likelihood of malfunction of a target device group among the at least one device group, based on the risk information regarding installation sites of respective process devices that constitute the target device group.

7. A computer program product comprising at least one non-transitory computer-readable medium including a risk assessment program for performing risk assessment of a steam plant that includes at least one device group that includes a steam-utilizing device that utilizes steam, a piping system that is connected to the steam-utilizing device, and process devices that are provided in the piping system, that, when executed by a computer cause the computer to perform:

a diagnosis result storing function of accumulatively storing diagnosis results of a plurality of diagnoses regarding each process device that is provided in the steam plant to be assessed, in association with installation sites of the process devices;

a risk information calculation function of calculating risk information regarding a likelihood of malfunction of a process device that is provided at a target installation site, based on diagnosis results regarding process devices that are provided at the target installation site; and a device group risk information calculation function of calculating device group risk information regarding a likelihood of malfunction of a target device group among the at least one device group, based on the risk information regarding installation sites of respective process devices that constitute the target device group.

* * * * *

UNITED STATES PATENT AND TRADEMARK OFFICE
CERTIFICATE OF CORRECTION

PATENT NO. : 10,942,508 B2
APPLICATION NO. : 16/614916
DATED : March 9, 2021
INVENTOR(S) : Yoshiyasu Fujiwara It is certified that error appears in the above-identified patent and that said Letters Patent is hereby corrected as shown below:

In the Claims

Column 24, Line 29, Claim 7, delete "computer" and insert -- computer, -- (first occurrence)

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*